United States Patent
Sen et al.

(10) Patent No.: US 8,311,956 B2
(45) Date of Patent: Nov. 13, 2012

(54) SCALABLE TRAFFIC CLASSIFIER AND CLASSIFIER TRAINING SYSTEM

(75) Inventors: Subhabrata Sen, New Providence, NJ (US); Nicholas Duffield, Summit, NJ (US); Patrick Haffner, Atlantic Highland, NJ (US); Jeffrey Erman, Morristown, NJ (US); Yu Jin, St. Paul, MN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 633 days.

(21) Appl. No.: 12/539,430

(22) Filed: Aug. 11, 2009

(65) Prior Publication Data

US 2011/0040706 A1 Feb. 17, 2011

(51) Int. Cl.
*G06F 15/18* (2006.01)
(52) U.S. Cl. ....................................................... 706/12
(58) Field of Classification Search ................ 706/12
See application file for complete search history.

(56) References Cited

OTHER PUBLICATIONS

T. Nguyen and G. Armitage, "A Survey of Techniques for Internet Traffic Classification using Machine Learning", IEEE Comm. Surv. & Tutorials, vol. 10, No. 4, 2008, pp. 56-75.*
B. Zadrozny and C. Elkan, "Transforming Classifier Scores into Accurate Multiclass Probability Estimates", ACM SIGKDD '02, Edmonton, Alberta, Canada, 2002, pp. 1-6.*
A. Torralba, K.P. Murphy, and W.T. Freeman, "Sharing Visual Features for Multicalss and Multiview Object Detection", IEEE Trans. on Pattern Analysis and Mach. Intelligence, vol. 29, No. 5, May 2007, pp. 854-869.*

* cited by examiner

*Primary Examiner* — Jeffrey A Gaffin
*Assistant Examiner* — Vincent Gonzales

(57) ABSTRACT

A traffic classifier has a plurality of binary classifiers, each associated with one of a plurality of calibrators. Each calibrator trained to translate an output score of the associated binary classifier into an estimated class probability value using a fitted logistic curve, each estimated class probability value indicating a probability that the packet flow on which the output score is based belongs to the traffic class associated with the binary classifier associated with the calibrator. The classifier training system configured to generate a training data based on network information gained using flow and packet sampling methods. In some embodiments, the classifier training system configured to generate reduced training data sets, one for each traffic class, reducing the training data related to traffic not associated with the traffic class.

12 Claims, 10 Drawing Sheets

(E) FTP (F) GAMES (G) MAIL (H) MULTIMEDIA (I) NETNEWS (J) SECURITY THREAT (K) VoIP (L) WEB

SCALABLE TRAFFIC CLASSIFIER AND CLASSIFIER TRAINING SYSTEM

BACKGROUND

1. Field of the Disclosure

The present disclosure is directed generally to classification of traffic in a packet network.

2. Description of the Related Art

Internet Protocol (IP) networks today carry a mixture of traffic for a diverse range of applications. The ability to accurately classify this traffic according to the types of applications that generate the traffic is vital to the workings of a wide swathe of IP network management functions including traffic engineering, capacity planning, traffic policing, traffic prioritization, monitoring service level agreements (SLAs) and security. For example, traffic classification is an essential first step for developing application workload characterizations and traffic models that in turn serve as inputs to efforts to optimize the network design, plan for future growth and adjust to changing trends in application usage.

Given the importance of the traffic classification problem, much effort has been devoted to develop traffic classifier systems and methods. The simplest classification method is to use port numbers, mapping the TCP or UDP server port of a connection to an application using the IANA (Internet Assigned Numbers Authority) list of registered or well known ports. Such fixed port based classification is known to be inherently unreliable for various reasons, all tied to the fact that an application has full discretion to determine its server port. Reasons why applications use non-standard ports include: (i) traversing firewalls, circumventing operating system restrictions and evading detection, (ii) dynamic allocation of server ports such as used by FTP for the data transfer, (iii) avoiding interference when the same standard port is used by multiple applications. For example, a SSH (secure shell) protocol, which runs on TCP port 22 is used both for interactive operations and for data downloads by the SCP (secure copy) file transfer protocol. For another example, many non-web applications are known to use ports 80, 8000, and 8080 (normally assumed to be "web ports") for crossing firewalls which often have these ports open. These limitations have fueled efforts to devise alternative approaches that use specific features present in the application generated traffic to guide the classification.

Another approach to traffic classification develops content-based application signatures based on deep packet inspection (DPI) of application layer (layer 7) features, looking deeper into a packet than just the network and transport layer headers. While very accurate, the approach necessitates the use of traffic capture devices that can scale for use with high speed links. This is an expensive proposition which limits the ability to deploy it on a wide scale. Using application layer (layer 7) signatures is also expensive in terms of the computational resources needed to process large data volumes, (e.g., signatures) requiring evaluation of regular expressions and variable offset signatures. Furthermore, specific policy environments may limit how application layer (layer 7) information is collected or utilized. Lastly, this approach does not work for encrypted content—(e.g., all the application-level information is hidden by IP-level encryption techniques used by security protocols like IPSEC).

A different approach to traffic classification has been to use traffic classifiers with flow-level statistic inputs to identify network applications associated with particular traffic flows. Classifiers in general are software modules that use algorithms to provide a classification of an object based on an input set of features describing the object. A flow-based traffic classifier provides a classification of a traffic flow based on flow level statistics of a traffic flow. The use of flow-based traffic classifiers overcomes many of the problems of application layer (layer 7) approaches. Flow-based traffic classifiers are scalable. As flow reporting has been widely deployed in commercial routers, obtaining flow reports network wide does not put extra requirements on deployment or require development of new router features. In fact, many network providers already perform flow records collection as a daily routine operation. Furthermore, this approach also avoids the potential limitations of port and application layer approaches mentioned above.

Classifiers must be generated or trained with a set of training data (i.e., inputs for which the class is known) before they can accurately classify live data (i.e., inputs for which the class is not known). Two machine learning algorithms that may be used for classifier training are SVM and Adaboost. Successful operation of SVM and Adaboost relies on two characteristics. First, uniform convergence bounds predict that the classification error observed on the test data only diverges from the training error within predictable bounds that depend on the number of examples, not on the number of features. The key underlying assumption is that test examples are "independent identically distributed (IID)." That is, the test examples are picked randomly from the same distribution as the training data. Second, training is a convex optimization problem with a guaranteed convergence in a time that is super linear in the number of training examples. These characteristics encourage a "black box" approach: one collects every possible feature for a representative set of training examples and trains an off-the-shelf classifier. Prior work on application classification using machine learning has focused exclusively on such a black box approach. In reality, many of the above assumptions do not hold for network traffic and a straightforward "black box" application of traditional machine learning is not well-suited to the IP traffic classification problem and can fail spectacularly. Even though the traffic classification problem follows the definition of a typical multi-class classification problem, there are many unique challenges.

A first challenge for traffic classification is that the IID assumption does not hold. The composition of applications and their relative traffic contributions have natural spatial and temporal variations. Even at the same monitoring point, the amount of traffic contributed by an application can vary over time (e.g. different applications can have different time of day or time of week effects) and hence the training and test sets can have different distributions.

A second challenge for traffic classification is that typical networks have an extremely large amount of traffic. How to make the most use of the potential large training data set is a key issue, since most machine learning algorithms will experience scalability problems.

A third challenge for traffic classification is to achieve accuracy and stability. To be applicable to high-speed networks, a classifier should exhibit high classification accuracy, and in addition, must be fast enough to keep up with high traffic volumes.

A fourth challenge for traffic classification is to provide versatility. Under different scenarios, there will be different requirements for traffic classification. For example, for the purpose of Internet accounting and billing, it is desirable to achieve high byte accuracy instead of high flow accuracy. As another example, in application identification and anomaly detection and prevention, a fast detection method is preferred where a decision is needed to be made before the entire flow is observed.

Several approaches have been proposed for traffic classification using machine learning with flow statistics using a Naive Bayes classifier. Bonfiglio et al. develop two approaches based on Naive Bayesian classifiers and Pearson's Chi-Square tests to detect Skype traffic. They use flow level statistics such as the packet length and arrival rate as features to detect this traffic. Bernaille et al. propose an approach using unsupervised learning of application classes by clustering of flow features and a derivation of heuristics for packet based identification. Similarly, Crotti et al. use packet sizes, inter-arrival times, and arrival order of the first N packets as features for their classifier. This approach constructs protocol fingerprints, which are histograms of the observed variables for a flow. Erman et al. propose a semi-supervised machine learning approach based on clustering flow statistics. In addition to machine learning based approaches, Karagiannis et al. propose a classification approach based on using behavioral analysis of the communication patterns of hosts.

However, these approaches do not point to a robust and scalable solution that addresses many of the practical challenges that need to be solved before such machine learning based classification can be deployed in commercial networks.

BRIEF DESCRIPTION OF THE SEVERAL VIEWS OF THE DRAWING(S)

DETAILED DESCRIPTION

Embodiments of a robust and scalable traffic classifier and methods for training such traffic classifiers are described herein. In the Figures, various objects are identified with reference numbers. If there are multiple instances of the same object in a figure, they will be referred to by the same reference number but with a different suffix number appended. In the following discussion, if a reference is made to a reference number that identifies multiple objects but without a suffix number appended, and then the reference is to all the multiple objects as a group.

Traffic Classifier

Figure 1:
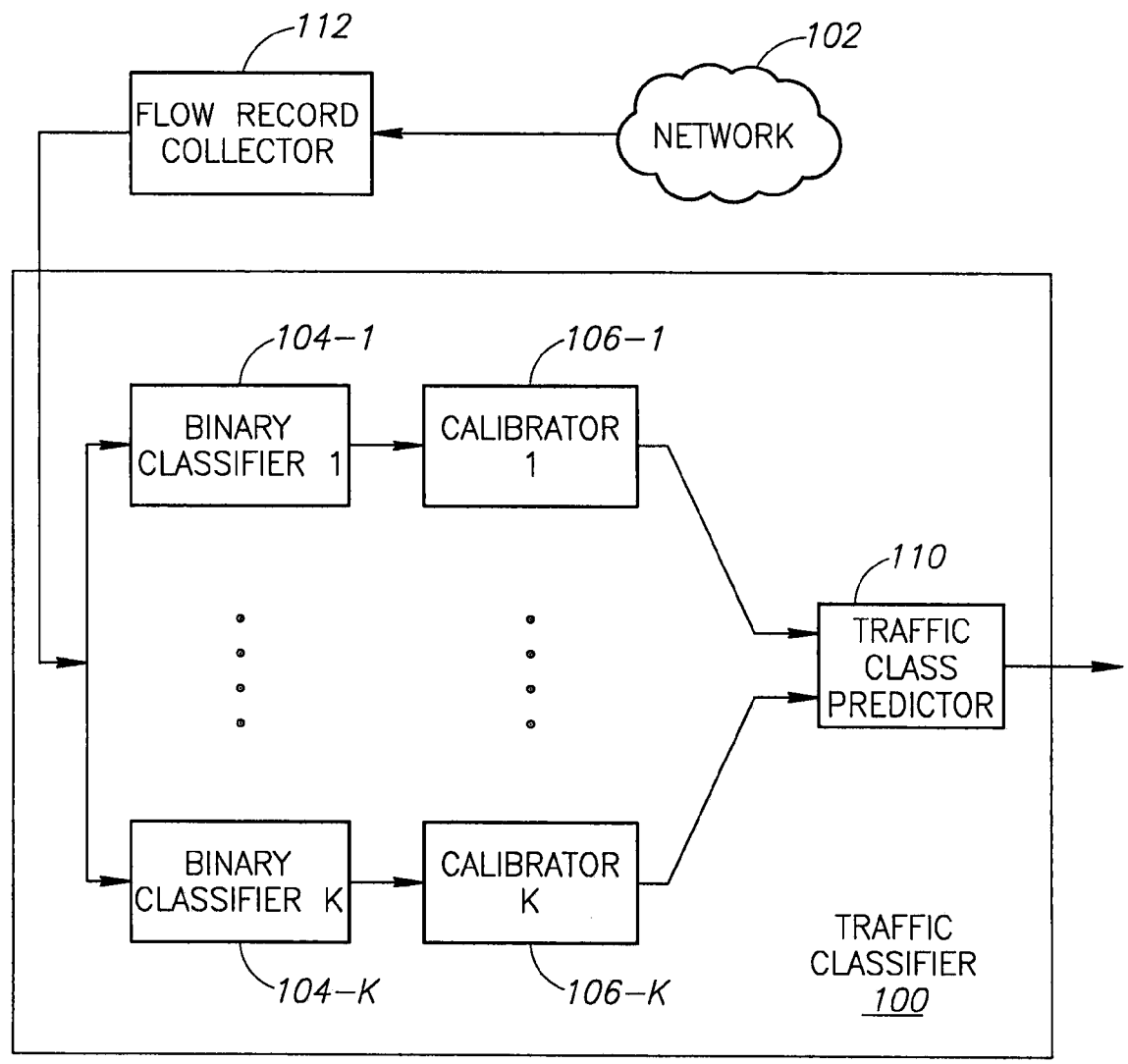
FIG. 1 is a block diagram of a traffic classifier.

FIG. 1 is a block diagram of a traffic classifier 100. The traffic classifier 100 is coupled with a flow record collector 112 and a network 102. The network 102 carries traffic flows that are generated by applications (not shown). The traffic classifier 100 is configured to classify traffic flows in the network 100 as belonging to one of a plurality of classes. Each class represents a type of application that may generate traffic. The preferred embodiment uses the set of classes shown in Table 2, but other embodiments may use different sets of classes. The components of the traffic classifier 100 are briefly described next, but details of the operation of the traffic classifier 100 will be discussed later herein.

The network 102 comprises a plurality of routers (not shown) configured to route packets according to Internet Protocol (IP). The routers are configured to detect flows of packets and generate flow records.

The flow record collector 112 is configured to store and manage flow records received from the network 102. The flow record collector 112 is configured to generate feature sets based on measurements of packet flows. Typically the flow record collector 112 extracts measurements of the packet flows from the flow records.

The traffic classifier 100 is configured to generate predictions of the traffic class for packet flows in the network 102 based on feature set inputs. Each feature set is based on measurements of a particular packet flow. The traffic classifier 100 comprises a set of binary classifiers 104, a set of calibrators 106 and a traffic class predictor 110.

Each binary classifier 104 is trained to generate an output score for each feature set input. In some embodiments, the number of binary classifiers 104 is equal to a number of classes of traffic in the traffic classification system. Other embodiments may have more or fewer classifiers relative to the number of classes. The binary classifiers 104 are configured to operate in parallel, each configured to receive the same feature set as input. As will be described in greater detail below, the output of the classifier 104 is not, in itself, a binary result. However, the complete process described below adjusts the various factors with a threshold applied to the score to end up with a binary classification. That is, does the data being analyzed belong to the application class or not.

Each calibrator 106 is associated with and coupled to one of the binary classifiers 104. Thus, each calibrator 106 is associated with the same traffic class as its associated binary classifier 104. Each calibrator 106 is trained to translate the output score received from its associated binary classifier 104 into an estimated class probability value using a fitted logistic curve. The estimated class probability value indicates a likelihood that the packet flow on which the output score is based belongs to the traffic class associated with the calibrator 106.

The traffic class predictor 110 is communicatively coupled with the set of calibrators 106. The traffic class predictor 110 is configured to determine a predicted traffic class based on the estimated class probability values received from the calibrators 106. The predicted traffic class is the one of the plurality of traffic classes to which the traffic class predictor 110 predicts that the packet flow belongs. In some embodiments, the traffic class predictor 110 is configured to determine the predicted traffic class by selecting the traffic class associated with the calibrator 106 associated with a highest of the estimated class probability value received from the set of calibrators 106. In other embodiments, a different criterion is used to determine the predicted traffic class.

The binary classifiers 104, the calibrators 106 and the traffic class predictor 110 are software modules which, in some embodiments are all hosted on a single server, but in most embodiments are hosted in a plurality of servers. A typical embodiment would have each binary classifier 104 and its associated calibrator 106 on a different server.

Classifier Training System

Figure 2:
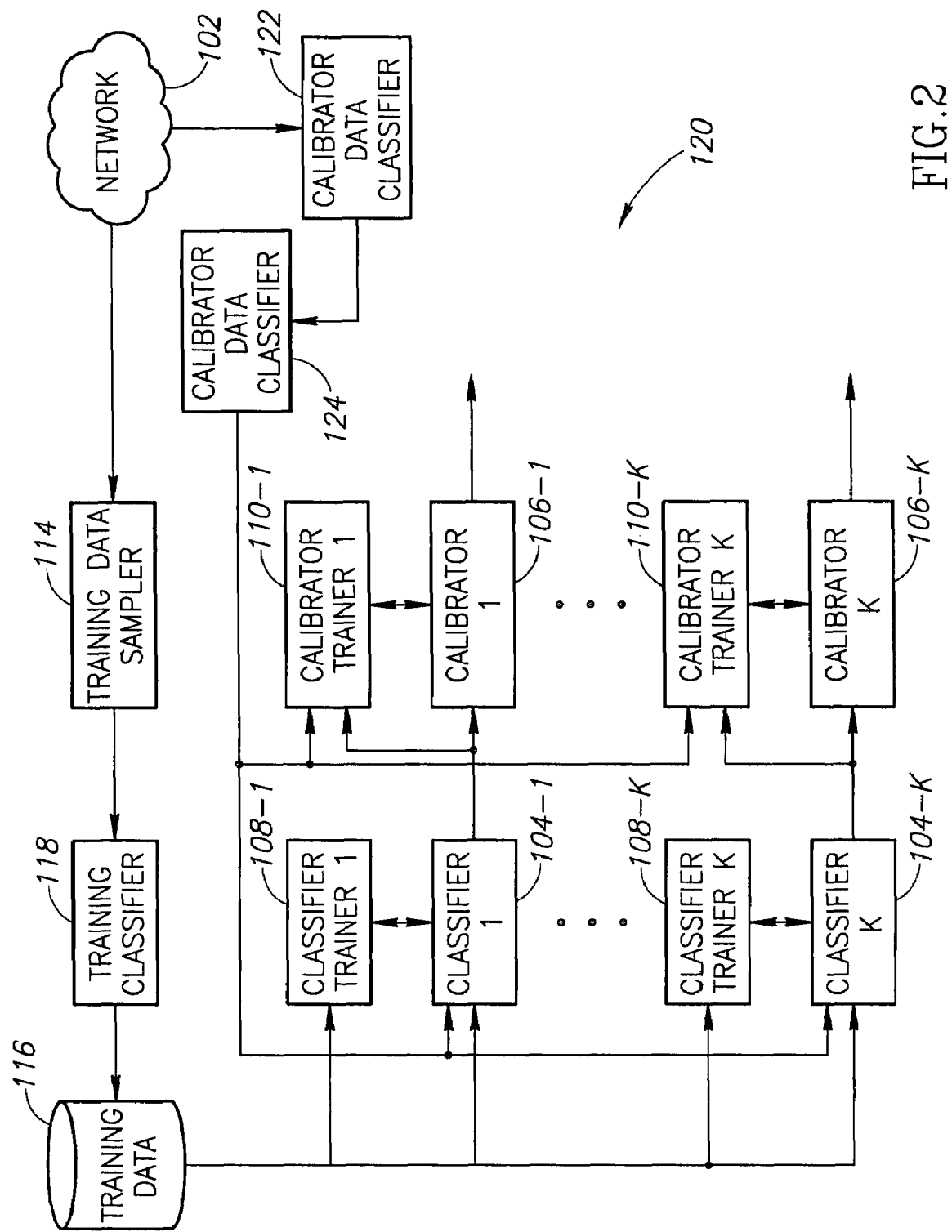
FIG. 2 is a block diagram showing a classifier training system.

FIG. 1 illustrates the operation of the traffic classifier 100 where the binary classifiers 104 and calibrators 106 have already been trained. FIG. 2 is a block diagram showing a classifier/calibrator training system 120. The training system 120 comprises a training data sampler 114, a training data classifier 118, a training database 116, a set of classifier trainers 108, and the set of binary classifiers 104 of the traffic classifier 100 from FIG. 1. FIG. 2 also illustrates a calibrator data sampler 122 and a calibrator data classifier 124. As will be discussed in greater detail below, the calibrator data sampler 122 and the calibrator classifier 124 are used by a calibrator trainer 110 in training the calibrators 106. The training system 120 is configured to train the set of binary classifiers 104 and calibrators 160 of the traffic classifier 100. Once training is complete, the trained traffic classifier 100 can be place into operation, receiving flow records from the network 102 and making traffic class predictions in real-time or near real-time (see FIG. 1). In some embodiments, training a binary classifier 104 includes generating a new software module where none previously existed. In other embodiments, the classifier trainer 108 operates on an existing binary classifier 104 to improve the performance of the binary classifier 104. The components of the classifier training system 120 are briefly described next, but details of the operation of the classifier training system 120 will be discussed later herein.

The training data sampler 114 is communicatively coupled with the network 102. The training data sampler 114 is configured to monitor traffic in the network 102 and generate traffic information based on the traffic. The training data sampler 114 is configured to select particular packets from the traffic for generation of traffic information based on one of several sampling methods. These methods may include flow sampling and packet sampling, described further herein.

In an exemplary embodiment, the training data sampler 114 could randomly sample communication traffic from the network 102. However, it has been determined that such random sampling may be ineffective for training the classifiers 104. In the example illustrated in FIG. 2, there are k classifiers 104 to represent k flow classes that are possible on the network 102. However, it is known that there is not an equal distribution of flow classes in the network 102. For example, the flow class represented by classifier 1 may be the most common flow class on the network and carry a large percentage of the traffic volume in the network 102. In contrast, the classifier k may represent a flow class that occurs infrequently within the network 102. A random sample of data in the network would fairly represent the percentages of traffic that are designated by each of the flow classes, but may not provide an adequate number of flow samples for the less seldom used flow classes, such as the class k described in the present example. To avoid this problem, the training data sampler 114 operates in conjunction with the training classifier 118 to select samples that provide a sufficient number of examples for each of the flow classes 1–k. Thus, the trainer classifier 118 uses highly selected data to provide an adequate number of flow samples for the various classes. Because this is not a random sampling, the probability distribution characteristics of the classifier training data may be statistically skewed. The calibrators 106 associated with each classifier de-skew the results and provide a more accurate classification process.

As will be described in greater detail below, the calibrator data sampler 122 randomly samples data from the network 102. The calibrator data classifier 124 analyzes each of the flows in detail to properly identify the flow type in each of the randomly collected samples. Thus, the training process illustrated in the functional block diagram of FIG. 2 occurs in two stages. In the first stage, the highly selected data is used to train the classifiers 104. In the second stage of the training process, the trained classifier 104 work in conjunction with its respective calibrator trainer 110 using randomly sampled data to train the calibrators 106 and thus de-skew the results of the classifiers 104. The resulting combination of trained classifier 104 and trained calibrator 106 provides a more accurate statistical distribution and thus more accurate flow identification results.

The training data classifier 118 is communicatively coupled with the training data sampler 114. The training data classifier 114 is configured to generate a training data set based on the traffic information generated by the training sampler 114. The training data set generated by the training data classifier 118 comprises a plurality of training flow sets. Each training flow set has a feature set and an associated class label. Each feature set comprises a set of flow features. Flow features are values related to a traffic flow that can be determined by examining network and transport layer packet headers, such as the destination port or the source IP address. Flow features are discussed in further detail later herein. The training data classifier 118 is configured to generate a feature set based on information extracted from a flow record. Some of the features are pieces of information extracted unaltered from the flow record. Other features are calculated values based on the information extracted from the flow record. The training data classifier 118 is configured to generate an associated class label for each flow record. In one embodiment, the training data classifier 118 generates the associated class labels by performing deep packet inspection (DPI) of data packets received from the network 102 associated with the packet flows represented by the selected flow records. DPI involves examining application information (layer 7) in the packets. This process can be computationally intensive and time consuming. The training data classifier 118 is configured to store the flow records and associated data packets for later processing.

The training database 116 is communicatively coupled with the training data classifier 118. The training database 116 is configured to receive and store the training data set.

The classifier trainers 108 are communicatively coupled with the training database 116. The set of classifier trainers 108 are configured to train the set of binary classifiers 104 using the training data set. Each classifier trainer 108 is configured to receive a copy of the training data set from the training database 116. The classifier trainers 108 use one of several different training algorithms to train the binary classifiers 104. These algorithms are described in further detail later herein. Each classifier trainer 108 is configured to run the training data set on the respective trained binary classifier 104 to generate a set of output scores.

After the training of the classifiers 104 has been completed, the training system 120 trains the calibrators 106 in a second stage of the training process. In this stage, the data from the calibrator data sampler 122, which is randomly selected, is classified and accurately labeled as to the particular flow type by the calibrator data classifier 124. The randomly sampled data is then supplied to each of the classifiers 104. The output of the classifiers 104 are fed to the respective calibrators 106 and calibrator trainers 110. The labels for the data flows, taken along with the output of the classifiers are used to generate a reliability diagram indicative of the operation of the classifiers 104 when presented with actual randomly sampled data. The calibrator trainer 110 uses the reliability diagrams in a process to train the calibrators 106. Thus, the trained calibrators 106 improve the reliability of the classifiers 104 and provide a more accurate result than would be provided by the trained classifiers alone.

The calibration trainers 110 are each configured to create a reliability diagram based on the respective set of output scores and the plurality of class labels from the training data set, then fit the reliability diagram to a logistic curve. This fitted logistic curve is the main part of the respective calibrator 106 and is used to translate the output score of the associated binary classifier 104 into an estimated class probability value. This calibrator training process is explained in more detail in a discussion later herein of FIGS. 4 and 5.

The training data sampler 114, the training data classifier 118, the training database 116, the set of classifier trainers 108, the calibrator data sampler 122, the calibrator data classifier 124, and the set of calibrator trainers 110 are software modules which in some embodiments are all hosted on a single server, but in most embodiments are hosted in a plurality of servers. In a typical embodiment, each classifier trainer 108 and its associated calibrator trainer 110 are on the same server, but separate from the other modules of the classifier training system 120. In such embodiments, the training data sampler 114, the training data classifier 118, the training database 116, the calibrator data sampler 122, and calibrator data classifier 124 are each hosted on individual servers. In some embodiments, once the training is complete, the trained binary classifiers 104 and associated calibrators 108 are extracted from the servers hosting the classifier training system 120 and loaded onto a different set of servers, before classifying live traffic. In other embodiments, the trained binary classifiers 104 and associated calibrators 106 remain on the servers hosting their respective classifier trainers 108 and associated calibrator trainers 110 and classify live traffic on those machines.

Training a Traffic Classifier

Figure 8:
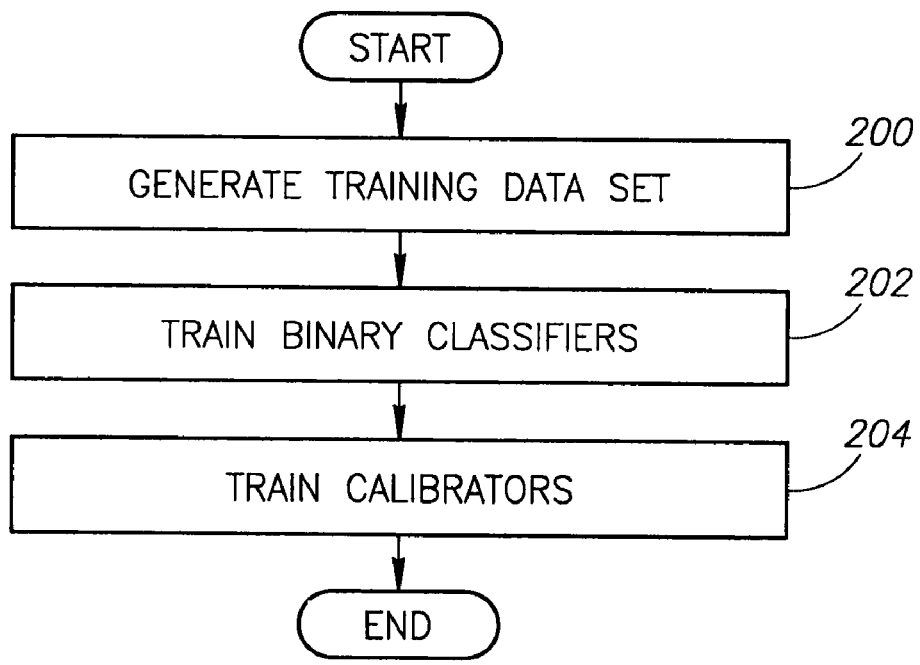
FIG. 8 is a flow diagram showing a method for training a traffic classifier.

FIG. 8 is a flow diagram showing a method for training a general traffic classifier 100. This method trains a traffic classifier such as the traffic classifier 100 shown in FIG. 1 using the classifier training system 120 shown in FIG. 2.

Generating a Training Data Set

In step 200, the classifier training system 120 generates a training data set. The training data set comprises a plurality of selected training flow sets. Each training flow set comprises one of a plurality of training feature sets and an associated one of a plurality of class labels. Each training feature set and associated class label is based on measurements of one of a plurality of training packet flows. The associated class label identifies to which one of a plurality of traffic classes each one of the plurality of training packet flows belongs.

Each feature set comprises key values of the associated packet flow—the standard 5-tuple of IP protocol, source and destination IP addresses, and source and destination TCP/UDP ports. Each feature set has packet and byte counts, time of the first and last observed packet and other flow level features listed in Table 1. The market features (*) in Table 1 are not directly measured from the packet flows, but are computed from quantities that are directly measured.

TABLE 1

| Name | Type |
|---|---|
| lowsreport | numeric |
| lowdstport | numeric |
| highsreport | numeric |
| highdstport | numeric |
| duration | numeric |
| packet | numeric |
| byte | numeric |
| Mean_packet_size (mps) | numeric |
| Mean_packet_rate (mpr) | numeric |
| tacpflags | text |
| tos | numeric |
| toscount | numeric |
| numtosbytes | numeric |
| srcinnet | {0, 1} |
| dstinnet | {0, 1} |

The duration, packet and byte fields represent the length of the flow, number of packets and bytes in the flow, respectively. Mean_packet_size, and mean_packet_rate stand for the average bytes per packet and the average packet arrival time in seconds. The tcpflag feature combines all possible Tcpflags in the packets. TOS (type of service) related features tos, toscount and numtosbytes are the predominant TOS byte, the number of packets that were marked with tos, and the number of different tos bytes seen in a flow, respectively. The lowsrcport, the lowdstport field, the highsrcport and the highdstport have a particular usage. If the source or destination port is above 1024, the lowsrcport and lowdstport fields are set to −1 and the highsrcport and highdstport fields records the port numbers. Otherwise, the port numbers are recorded in the lowsrcport and lowdstport fields and the highsrcport and highdstport fields are set to −1. The srcinnet and dstinnet field is set to 1 if the source or destination address is in the network and set to 0 otherwise.

As mentioned above each feature set is associated with a class label based on level-4 and level-7 application signatures identified in the packet flow on which the feature set is based. Each class label identifies one of a plurality of classes. For example, applications generating traffic on the network 102 can be categorized into 12 TCP classes and 8 UDP classes, as shown in Table 2.

TABLE 2

TCP/UDP Traffic Classes

| Index | TCP/UDP | Class | Description |
|---|---|---|---|
| 1 | TCP/UDP | Business | Middleware, VPN, etc. |
| 2 | TCP/UDP | Chat | Messengers, IRC, etc. |
| 3 | TCP/UDP | DNS | DNS Application |
| 4 | TCP/UDP | FileSharing | P2P Applications |
| 5 | TCP | FTP | FTP Application |
| 6 | TCP/UDP | Games | Everquest, WoW, Xbox, etc. |
| 7 | TCP | Mail | SMTP and POP |
| 8 | TCP/UDP | Multimedia | RTSP, MS-Streaming, etc. |
| 9 | TCP/UDP | NetNews | News |
| 10 | TCP | SecurityThreat | Worms and Trojans |
| 11 | TCP/UDP | VoIP | SIP Application |
| 12 | TCP | Web | HTTP Application |
| 13 | TCP/UDP | Unknown | Application is Unknown |

Training the Binary Classifiers

In step 202, the classifier training system 120 trains a plurality of binary classifiers 104 using the training data set. As discussed before, each binary classifier 104 is associated with one of the plurality of traffic classes. After training of the binary classifiers 104 is complete, each binary classifier 104 is configured to generate an output score based a feature set input.

The goal for training a traffic classifier 100 with a plurality of binary classifiers 104 may be formalized as follows. Let $F=\{(x_1, y_1), (x_2, y_2) \ldots, (x_n, y_n)\}$ be a training data set of n flow sets. Each $x_i=\{x_{ij}, 1 \leq j \leq m\}$, meaning $x_i$ is an m-dimensional vector representing a feature set of m features, where $x_{ij}$ stands for the $j^{th}$ feature in the $i^{th}$ feature set. Feature $x_{ij}$ can be either categorical (e.g., tcpflag) or numerical (e.g., flow duration). Each $y_i \in \{C_1, C_2, \ldots C_k\}$, meaning $y_i$ is a class label corresponding to feature set $x_i$ and identifying a traffic class $C_g\{1 \leq g \leq k\}$, from the predefined k number of traffic classes $\{C_1, C_2, \ldots C_k\}$. Training should result in an efficient yet accurate traffic classifier 100 that can be used to attribute a traffic class $C_g$ to any feature set $x_i$.

Partitioning the multi-class traffic classifier 100 described above into several simpler binary classifiers 104 offers potential trade-offs between scalability and performance. The partition strategy used in the embodiments herein is, for each of the k classes, to train a binary classifier 104 with a one-vs.-rest output that separates examples belonging to this class from all others. Each binary classifier 104 is trained by considering examples from the respective class as positive instances and the rest as negative instances. The practical advantages of using binary classifiers 104 are considerable. An algorithm to train a classifier for k classes requires k times as many parameters, and at least k times more learning time, than a simple binary classifier 104. Therefore, compared to a single multi-class classifier, training k binary classifiers 104 can be both cheaper and faster. A computer used for training requires up to k times less memory. With parallelization on k computers, one can train the k binary classifiers 104 at least k times faster. Another advantage is simpler model analysis: one can clearly tie the use of a feature to the discrimination of a given class. This would not be the case for a single multi-class classifier.

Many machine learning algorithms can be used to train the binary classifiers 104. However, the embodiments described herein balance complexity and description power to fulfill the requirements of both accuracy and possible interaction with the human expert. These requirements are best met with algorithms that minimize the number of features they use to perform the classification. This is typically the case for algorithms that greedily add features and where one can apply early stopping to control the number of features. Adaboost is one such algorithm.

In some embodiments, Adaboost is used to train to train the binary classifiers 104. Adaboost is a well known algorithm that generates and linearly combines a set of features to create an accurate binary classifier. In Adaboost, features may be referred to as "weak learners." In the present discussion, weak learners may be considered as an exemplary form of a feature that is analyzed in the classification process. Each generated weak learner $h_t$ maps a feature set vector x onto the binary decision, represented symbolically as $h_t(x_i) \in \{-1, 1\}$. Formula (1) describes such a binary classifier 104 generating an output score $f_{Cg}(x_i)$, where each weak learner $h_t(x)$ is generated at a $t^{th}$ training iteration of a total of T training iterations, and $\alpha_t$ stands for a weight assigned to this weak learner $h_t(x)$.

$$f_{cg}(x_i) := \sum_{t=1}^{T} \alpha_t h_t(x_i) \quad \text{Equation 1}$$

The output score $f_{Cg}(x_i)$ is a real number, corresponding to a positive instance when it exceeds some training threshold $\delta$. The training threshold $\delta$ is specific to class C. The Adaboost process uses an initial threshold of zero. A better value is obtained through the calibration process and may be substituted into equation 1. The weights $\alpha_t$ are chosen to minimize a classification error, defined as shown in Equation (2).

$$\Sigma_i I(z_i \neq \text{sign}(\Sigma_t \alpha_t h_t(x_i) - \delta)) \quad \text{Equation 2}$$

The value I is an indicator function: it is 1 if the input is true and 0 otherwise. The equation (2) indicates the number of times the binary prediction of whether the data is on the class (i.e., the sign( . . . )) is not equal to z_i, the actual binary class membership.

Iteration output $z_i$ is +1 for positive examples, and −1 for negative examples. That is, positive examples are those for which data is in the class in question while negative examples are data that are not in the class in question. The magnitude of the output score $f_{Cg}(x_i)$ is proportional to the confidence of a binary prediction of whether the flow associated with feature set $x_i$ belongs to class $C_g$.

Several different types of weak learners may be used. In preferred embodiments, the weak learner is a decision stump, which is the simplest weak learner. A decision stump applies a single threshold decision over one of the flow features from Table 1. Adaboost learns a sparse weight over a feature set vector of very large dimension made of all possible weak learners. That is, Adaboost uses the learning process in an effort to construct a classifier in which a relatively small number of weights at in equation 2 have a non-zero value. In other embodiments, the weak learner is a decision tree, applying a hierarchy of threshold decisions over different features. While a boosted decision tree (a decision tree trained by Adaboost) is still a linear classifier on decision tree features, it has the representation power of a more complex non-linear classifier that can handle conjunction of features.

One of the main limitations of Adaboost is that it may over fit on noisy data. Adaboost does better on data with very little noise, and this is the case for the traffic classification problem.

In other embodiments, the well known L1-regularized Maximum Entropy (Maxent) algorithm is used to train the binary classifiers 104. Maxent is another infinite ensemble learner that shares some similarities with Adaboost. Maxent classifier training aims to approximate the probability distribution $p(C_g|x)$ for each class $C_g$ with the simplest possible distribution, corresponding to maximum entropy. The specific Maxent algorithm greedily adds weak learners in a way that is similar to Adaboost. Maxent converges to an optimum that maximizes the conditional likelihood while minimizing the L1 norm of the weight vector, and thus the number of non-zero feature weights. This is desirable because each flow feature can give rise to an infinite number of possible binary stump features, one per possible threshold. Theory and experiments show convergence even with very noisy data.

L1-regularization can be seen as the driving principle for choosing suitable algorithms for training the binary classifiers 104 (note: Adaboost implicitly applies a form of L1-regularization). Both Adaboost and L1-regularized L1-Maxent can be contrasted with training algorithms that minimize the Euclidean (L2) norm of the weight vector, in particular, Support Vector Machines (SVMs). But such algorithms have problems with numerical features that require a fine level of thresholding, such as the port number in our problem. The problem can be addressed in SVMs through the use of stump kernels, although their use increases learning complexity. This issue is discussed in *Support Vector Machinery for Infinite Ensemble Learning* by H. T. Lin and L. Li, J. Mach. Learn. Res. 9:285-312, 2009. Preliminary experiments on smaller flow classification problems show that SVMs with stump kernels do not perform better than Adaboost.

Training the Calibrator

In step 204, the classifier training system 120 trains a plurality of calibrators 106 using the randomly selected calibrator training data derived from the calibrator data sampler 122 (see FIG. 2) and the calibrator data classifier 124. Training the plurality of calibrators 106 includes training each calibrator 106 to have the ability to translate the output score of the associated binary classifier 104 into an estimated class probability value $P(C_g|x_i)$. The estimated class probability value $P(C_g|x_i)$ indicates a posterior probability that the packet flow on which the output score is based belongs to the traffic class associated with the binary classifier 104 associated with the calibrator 106.

The k individual binary classifiers 104 are insufficient to accurately classify a traffic flow associated with a given feature set $x_i$. Each binary classifier 104 associated is with a different class $C_g$ and generates an output score $f_{C_g}(x_i)$ proportional to the confidence that the flow associated with $x_i$ belongs to the associated class $C_g$. However, simply choosing the class $C_g$ associated with the maximum output score $f_{C_g}(x_i)$ does not in general yield a solution that minimizes classification error for the equivalent full multi-class problem. A second stage is needed to calibrate the output score $f_{C_g}(x_i)$. Logistic calibration is used to remap the output score $f_{C_g}(x_i)$ to an estimated class probability value $P(C_g|x_i)$, the posterior probability that a packet flow represented by flow set $x_i$ belongs to traffic class $C_g$. Deviations from optimality resulting from this decoupled two-stage approach do not cause any significant increase in error in practice.

Calibration addresses two major problems. First, when sampling is used to generate the training data set for classifier training, the training data set will have a different distribution from any live traffic data. Second, the output score does not yield the true class probability value $P(C_g|x_i)$, and hence the k output scores cannot be used directly to provide a true multi-class prediction.

Figure 5A:
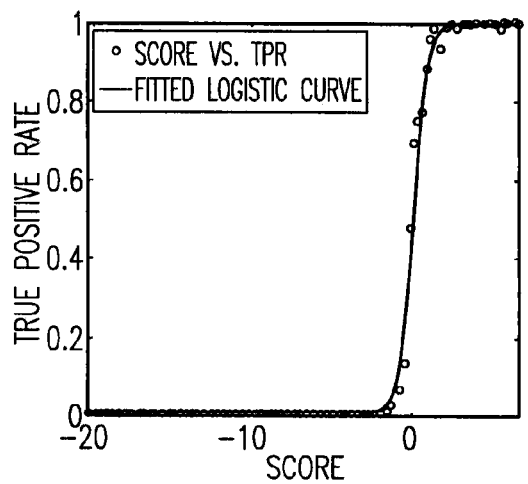
FIGS. 5A-5C are a group of reliability diagrams.
Figure 5A:
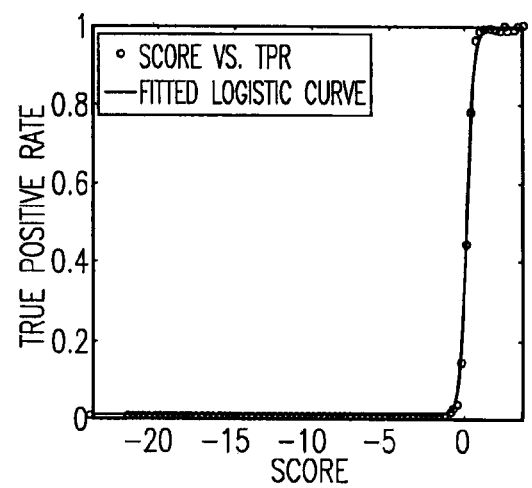
Figure 5A:
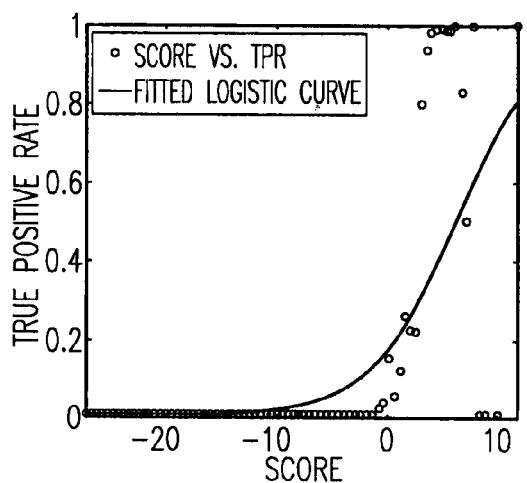
Figure 5A:
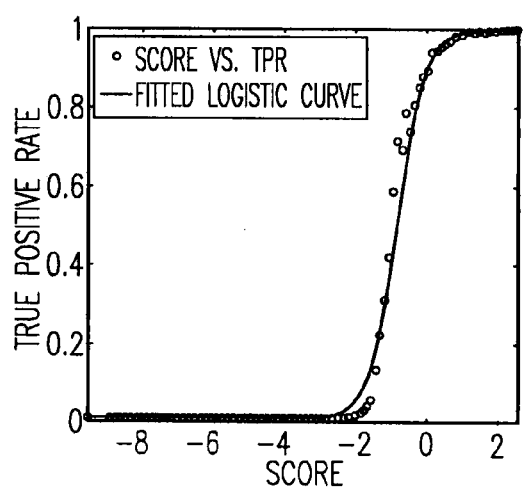
Figure 5B:
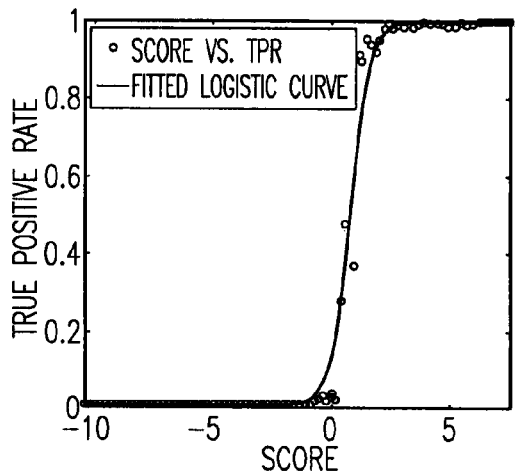
Figure 5B:
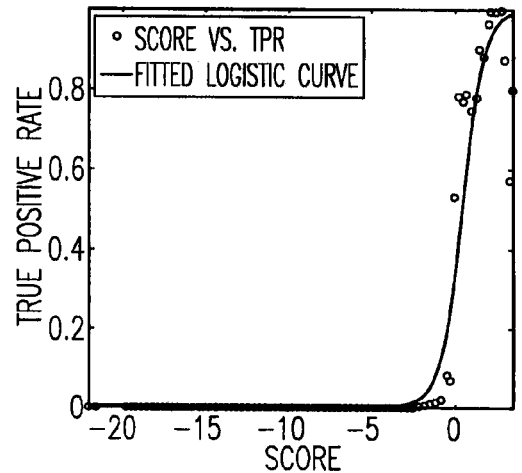
Figure 5B:
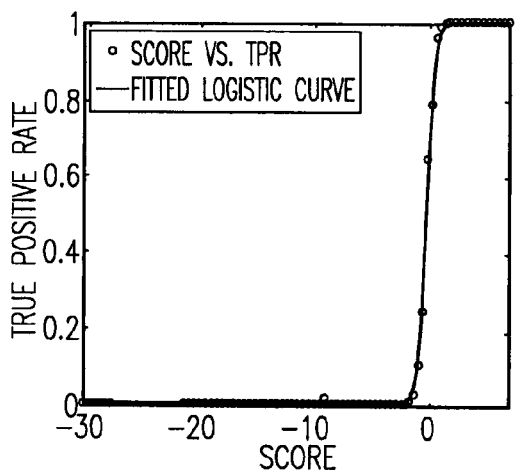
Figure 5B:
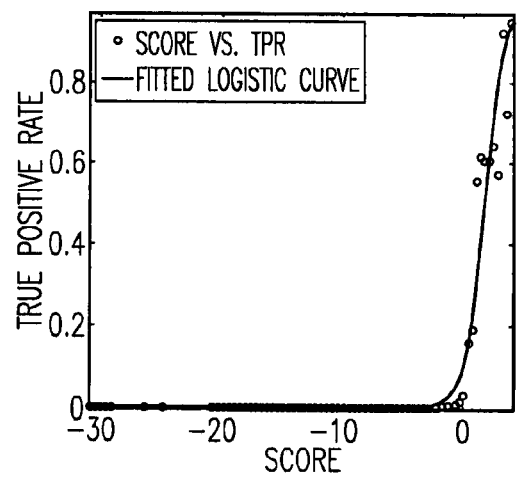
Figure 5C:
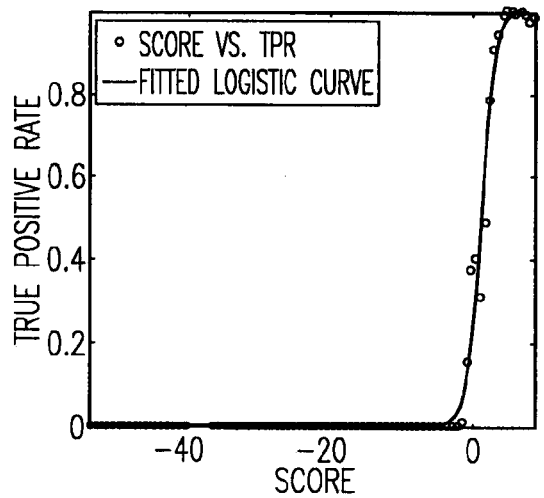
Figure 5C:
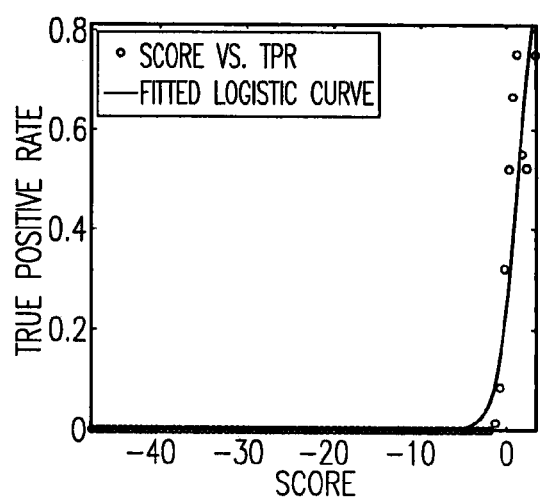
Figure 5C:
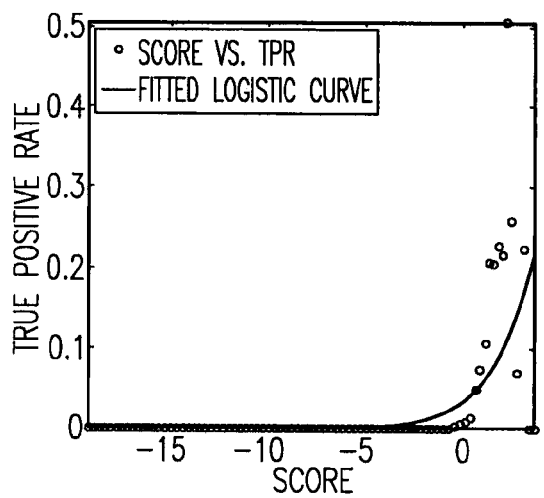
Figure 5C:
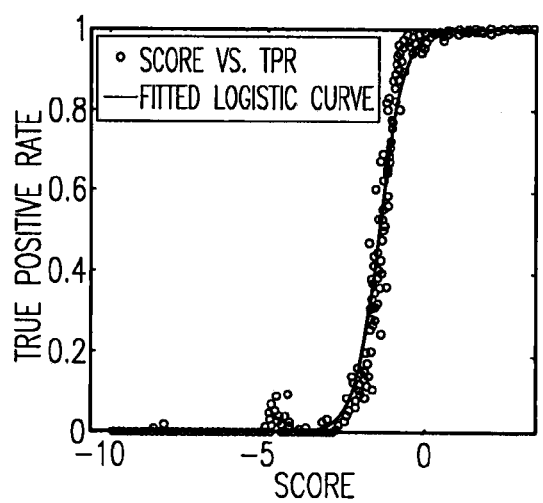

FIGS. 5A-5C are graphs of a true positive identification rate for each designated type of traffic flow versus the score generated by the classifier 104 for an unknown flow type. Each of the binary classifiers 104 will generate an output score that can have a positive or negative value. To generate the data for FIGS. 5A-5C, a labeled calibration flow set is selected independent of the training set and the classifier 104 analyzes the selected calibration set. For each flow in the calibration set, the classifier 104 will generate an output score in the real space. All data flows in the calibration set are portioned into N bins (N=100 in the experiments described herein) according to the score associated with each flow. The true positive rate of the flows is then computed in each bin. FIGS. 5A-5C are essentially the true positive rate of the flows in each bin versus the mean score value of the flows in the same bin. The calibrator 106 learns the mapping between the scores to the probabilities from these figures. During operation, the numerical output values generated by the binary classifiers 104 are provided to the calibrators 106 to generate the appropriate probability values from the scores provided by the binary classifiers. These probabilities are then combined to generate the multi-class classification results.

Figure 4:
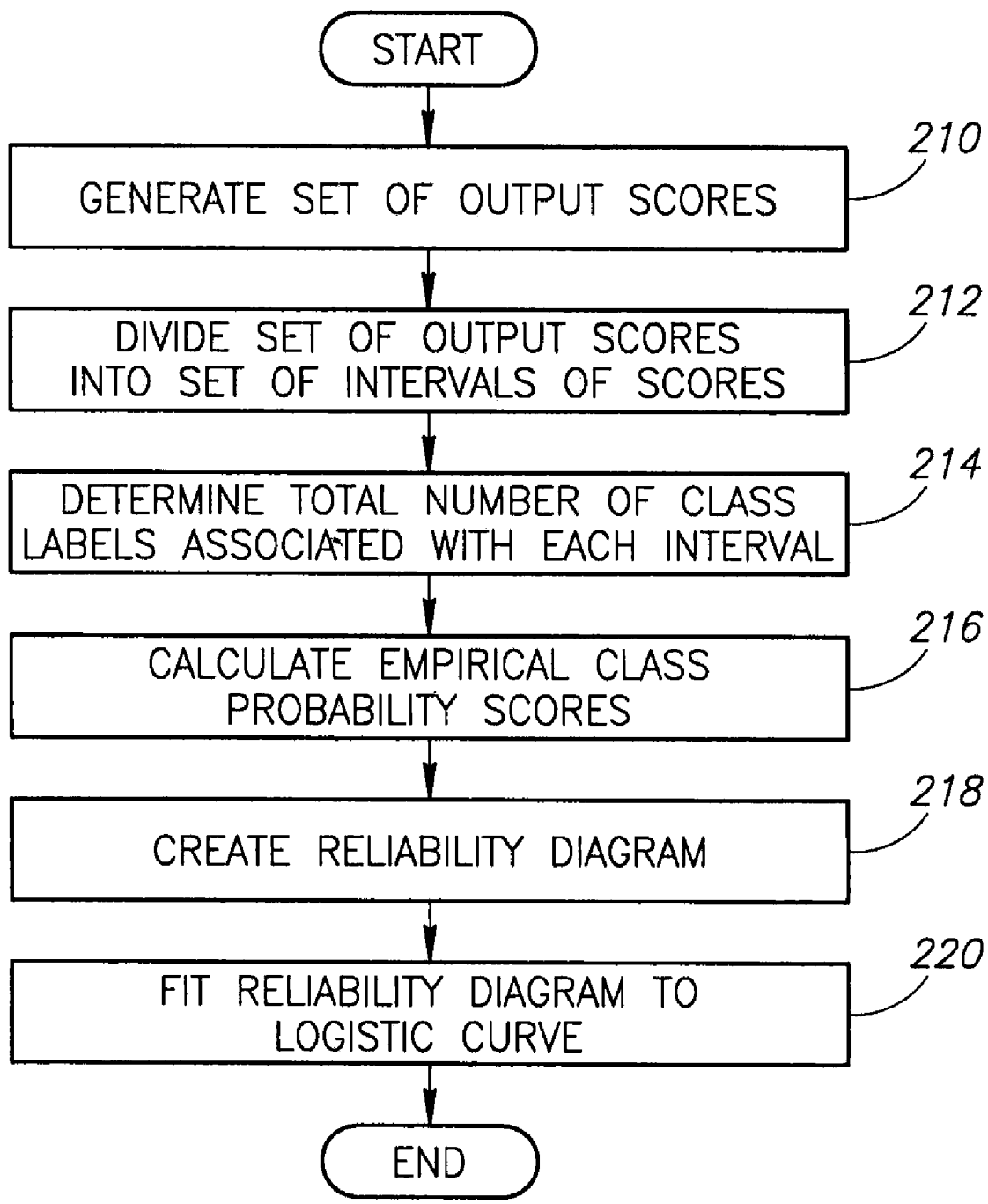
FIG. 4 is a flow chart showing a method for training a calibrator.

FIG. 4 is a flow chart showing details of a method for training a calibrator 106. The calibration method is based on an observation of the logistic relation between the output scores from the binary classifiers 104 and the empirical class probabilities. This can be visualized from the reliability diagrams in FIGS. 5A-5C. Each reliability diagram corresponds to the training results for a specific binary classifier 104 associated with a traffic class $C_g$, where an x-axis represents output score intervals, and a y-axis represents empirical class probability values (true positive rate).

As discussed above, the classifiers 104 are trained prior to the calibrator training process. In step 210 (see FIG. 4), the trained binary classifier 104 generates set of output scores using the calibrator training data derived from the calibrator.

In step 212, the calibrator trainer 110 divides the set of output scores into a set of intervals of scores.

In step 214, the calibrator trainer 110 determines for each interval, a total number of class labels associated with the interval as well as a number of matching class labels associated the interval. The class labels associated the interval are class labels associated with the same flow set as used to generate any of the output scores in the interval. The matching class labels identify the same traffic class associated with the binary classifier 104.

In step 216, the calibrator trainer 110 calculates a set of empirical class probability values. One empirical class probability value is calculated for each interval by dividing the number of matching class labels associated with the interval by the total number of class labels associated with the interval.

In step 218, the calibrator trainer 110 creates a reliability diagram by mapping the set of empirical class probability values against the set of intervals.

In step 220, the calibrator trainer 110 fits the reliability diagram to a logistic curve. For an ideal binary classifier 104, the output scores match the true class probability value $P(C_g|x_i)$ perfectly, so all the points in the associated reliability diagram should be along a diagonal line. However, for the non-ideal binary classifiers 104 used in these embodiments, the points more closely follow a logistic curve. Let $f_{C_g}(x)$ denote the predicted output score based on flow feature set $x_i$ from a binary classifier 104 associated with traffic class $C_g$. The logistic relation can be expressed as shown in Equation 3:

$$P(C_g \mid x_i) = \frac{1}{1 + \exp(-\alpha f_{C_g}(x_i) - \beta)} \qquad \text{Equation 3}$$

The parameters $\alpha$ and $\beta$ are computed based on the reliability diagram and determined by fitting a logistic curve to all the points on the reliability diagram. Such logistic curves are also displayed in FIGS. 5A-5C for various traffic classes.

In the process of computing $\alpha$ and $\beta$, choosing the number of score intervals to construct the reliability diagram is important. A large enough number of intervals are required to accurately fit a logistic regression curve. However, too many intervals will result in more outliers. Empirical studies indicate that a number of intervals between 50 and 100 generally provide satisfactory results.

Classifying Traffic in Real-Time

Figure 6:
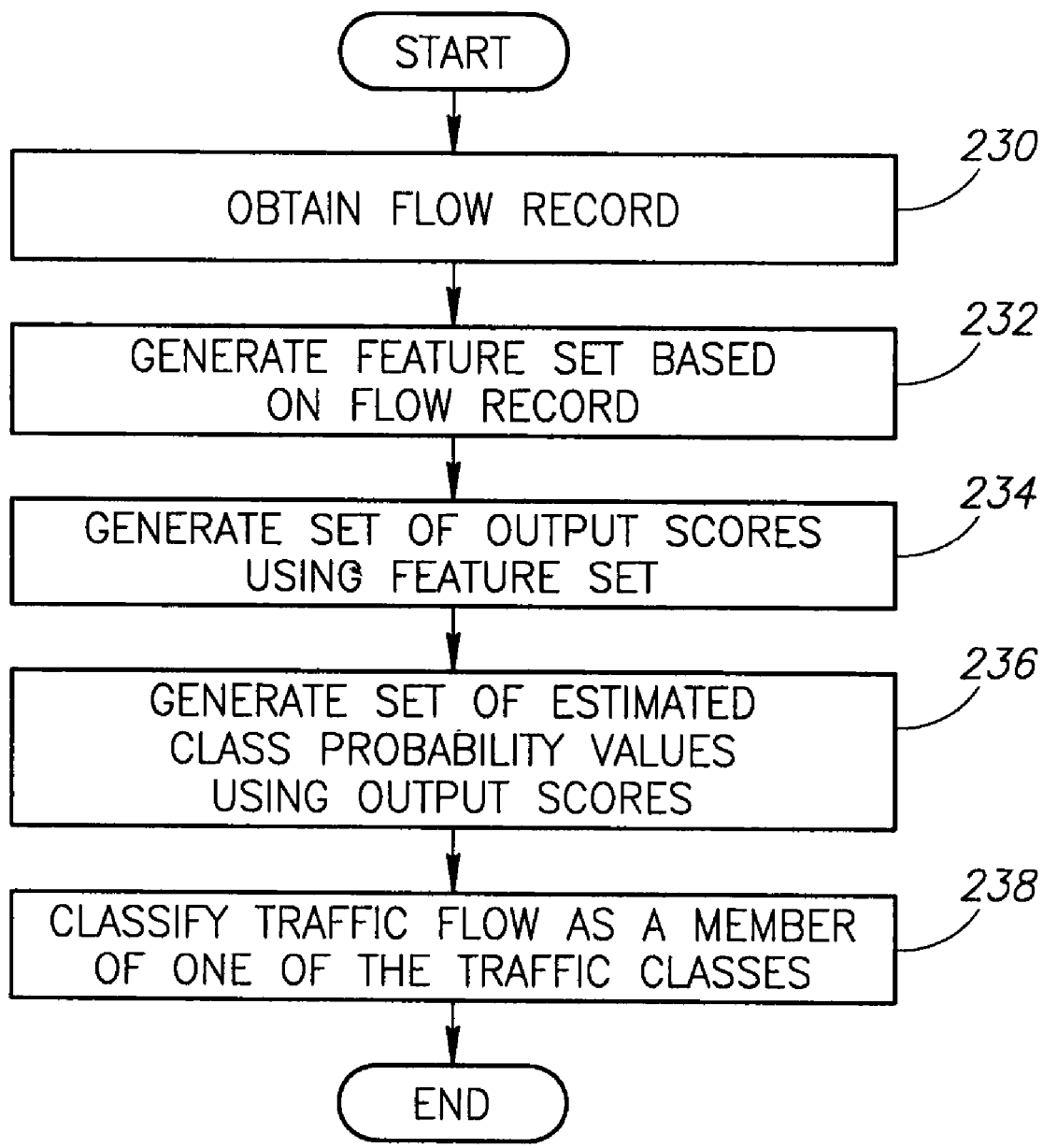
FIG. 6 is a flow chart showing a method for classifying traffic in the network.

Once the set of binary classifiers 104 and associated calibrators have been trained, the traffic classifier 100 can be put into operation classifying live traffic in the network 102. FIG. 6 is a flow chart showing a method for classifying traffic in the network 102 (see FIG. 1).

In step 230, the flow record collector 112 obtains a flow record based on a measurement of a packet flow in the network 102 (see FIG. 1). Flow records are generated by routers or network monitoring devices and sent to the flow record collector 112. Flow record collection is well known in the art and need not be described in greater detail herein.

In step 232, the flow record collector 112 generates a feature set based on the flow record. In some embodiments, at least a portion of the features are extracted directly from the flow record. In some embodiments, at least a portion of the features are calculated values base on information extracted from the flow record. In most embodiments, this step is performed by the flow record collector 112, but in other embodiments is performed by a different device.

In step 234, the binary classifiers 104 generate a set of output scores using the feature set as input for the plurality of binary classifiers 104. The plurality of binary classifiers 104 are configured to operate in parallel, each binary classifier 104 associated with one of k traffic classes.

In step 236, the calibrators 106 generate a set of estimated class probability values using the set of output scores as input for the calibrators 106. Each calibrator 106 is associated with one of the binary classifiers 104. Each calibrator 106 translates the output score of the associated classifier into an associated one of the set of estimated class probability values using a fitted logistic curve. Each estimated class probability value indicates an estimated probability that the packet flow on which the output score is based belongs to the traffic class associated the respective binary classifier 104 and associated calibrator 106.

In step 238, the traffic class predictor 110 attributes membership in one of the k traffic classes to the packet flow based on the set of estimated class probability values. In most embodiments, this entails nothing more than determining which of the set of estimated class probability values has the greatest value and attributing membership to the packet flow in the traffic class associated with that greatest estimated class probability value.

Training Using Flow and Packet Sampling

The training data sampler 114 (see FIGS. 2 and 3) uses flow and packet sampling to limit the size of the training data set. In one embodiment, the training data sampler 114 selects a portion of the flow records generated at a uniform sampling rate. In packet sampling, the training data sampler 114 selects packets at a uniform sampling rate from a portion of the packets not in packet flow selected for flow sampling. The sampling decisions in flow and packet sampling do not explicitly depend on the flow key values or other features. Flow feature values are not modified by the operation of flow and packet sampling. In some embodiments, the training data sampler 114 uses one of two types of sampling: flow sampling and packet sampling. In some embodiments, the training data sampler 114 uses both types. In other embodiments, a different type of sampling is used. In some embodiments, the training data sampler 114 uses both types. In other embodiments, a different type of sampling is used.

Figure 7:
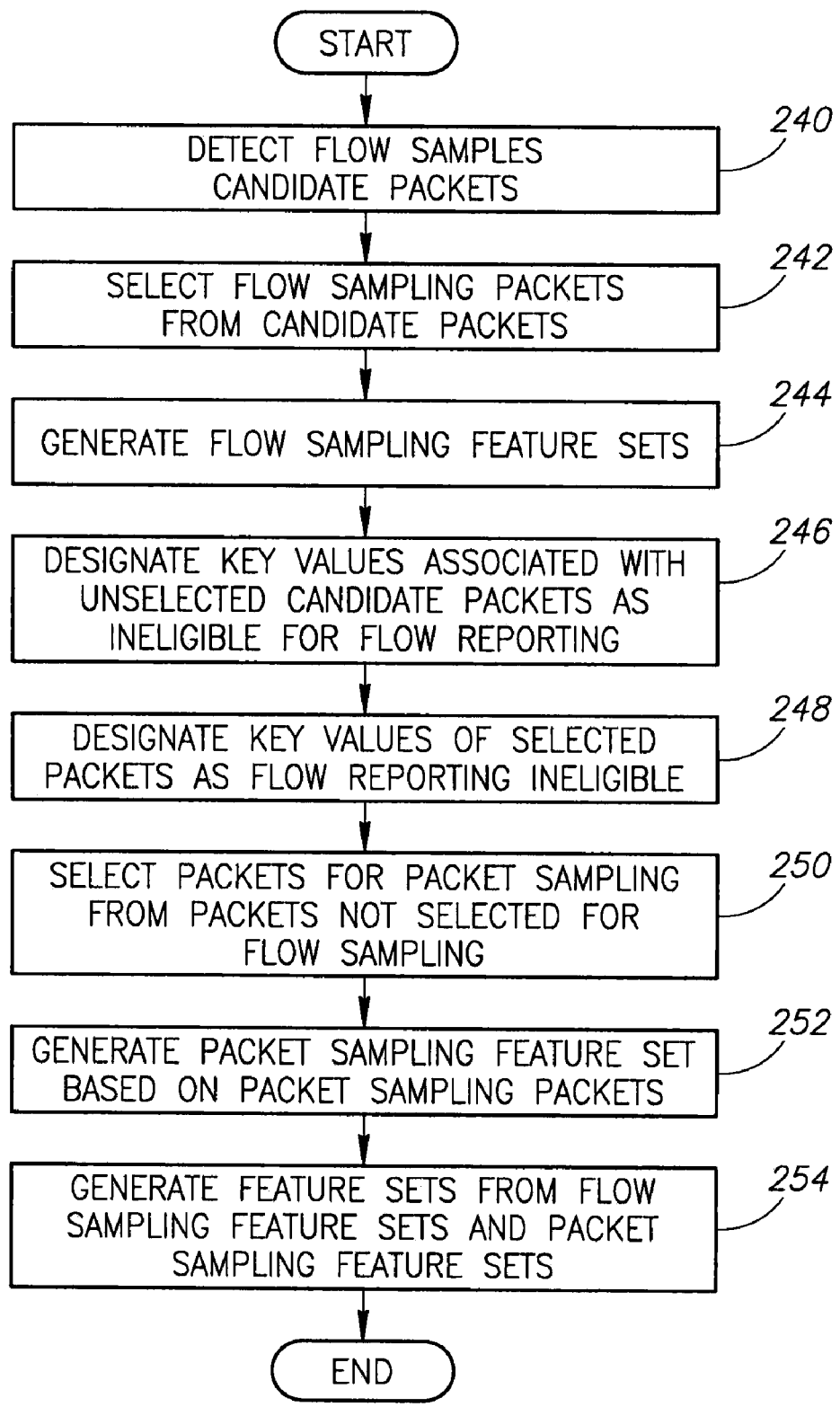
FIG. 7 is a flow diagram showing a method for flow and packet sampling.

FIG. 7 is a flow diagram showing a method for the classifier training system 120 to perform flow and packet sampling. Steps 240-248 are an embodiment of flow sampling and steps 250-254 illustrate an embodiment of feature set generation.

In step 240, the training data sampler 114 detects flow sampling candidate packets in the network 102. The training data sampler 114 reads key values of packets traveling through the network 102 at one or more points in the network 102. The flow sampling candidate packets are packets with key values that have not been designated by the training data sampler 144 as flow reporting ineligible.

In step 242, the training data sampler 114 selects flow sampling packets from the flow sampling candidate packets based on a specified flow sampling rate. Any subsequent packet with a key value matching a key value of one of the selected flow sampling packets within a certain time period causes the flow record associated with that key value to be updated accordingly (i.e., updating packet and byte counts and timing information). Flow sampling can be terminated by both inactive and also active timeout at the end of a periodic window. Flow records with matching key values in consecutive windows are aggregated in post processing.

In step 244, the training data sampler 114 generates flow sampling feature sets based on the flow sampling packets.

In step 246, the training data sampler 114 designates key values associated with flow sampling candidate packets not selected to be flow sampling packets as flow reporting ineligible for a period of time.

In step 248, the training data sampler 114 designates key values of flow sampling packets as flow reporting ineligible while generating the respective flow sampling feature set.

In step 250, the training data sampler 114 selects packet sampling packets at a packet sampling rate from the packets not selected as flow sampling packets.

In step 252, the training data sampler 114 generates packet sampling feature sets based on the packet sampling packets.

In step 254, the training data sampler 114 generates a plurality of training feature sets by aggregating the flow sampling feature sets and the packet sampling feature sets.

Training with Class Sampling

Classification accuracy increases with the size of the training data set. However, the binary classifiers 104 employed come with scalability constraints that, under specific hardware configurations, limit the number of flows that can be used for training (e.g., 1 million flow sets for a binary BStump classifier and only 100K flow sets for a binary BTree classifier). Therefore, some form of sampling is desired to reduce the size of the training data set. However, simple uniform sampling across all traffic samples will yield few examples from low volume classes, making it difficult to train binary classifiers 104 for identifying such flows accurately.

Figure 3:
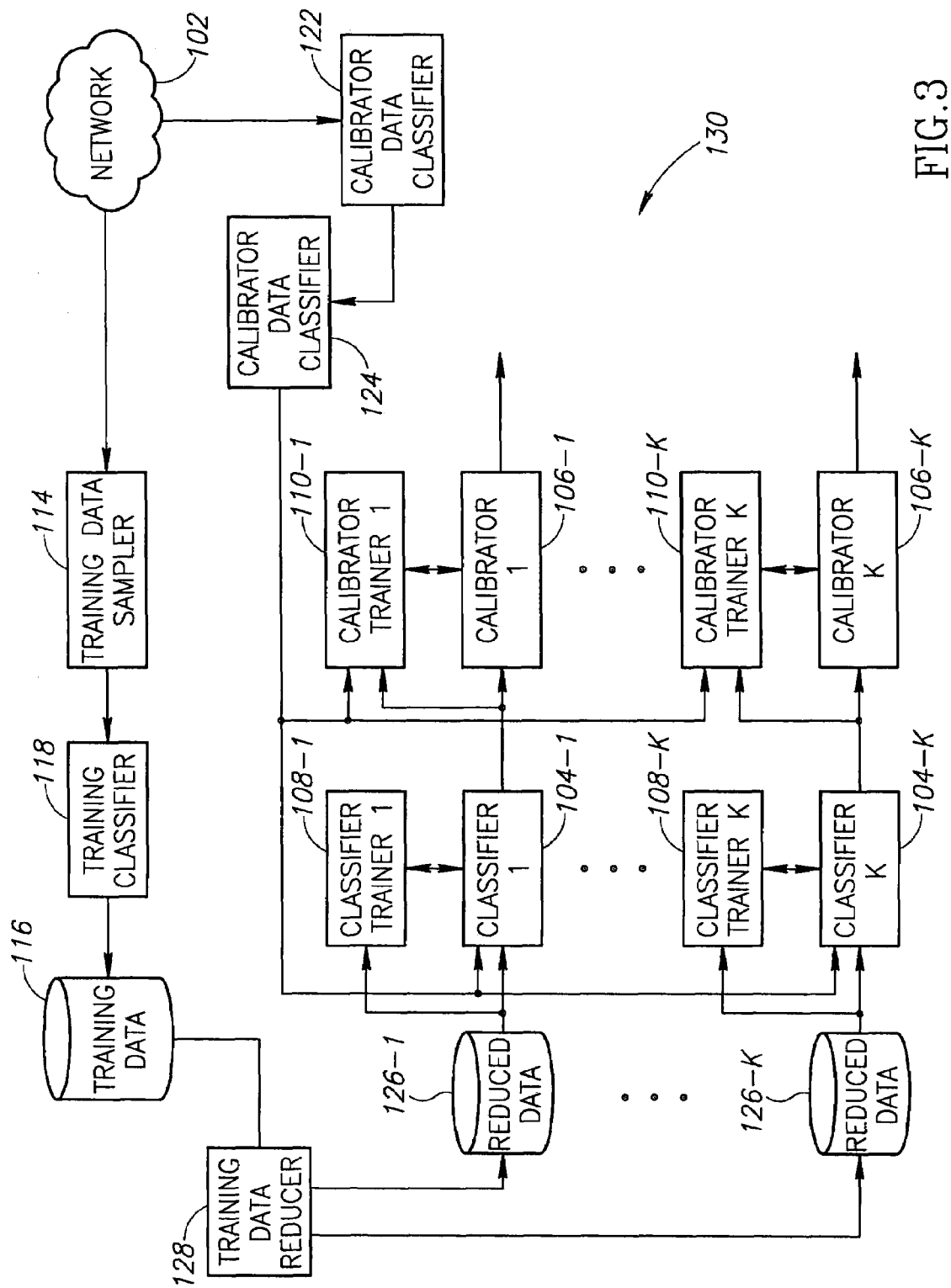
FIG. 3 is a block diagram showing a reduced data classifier training system.
Figure 9:
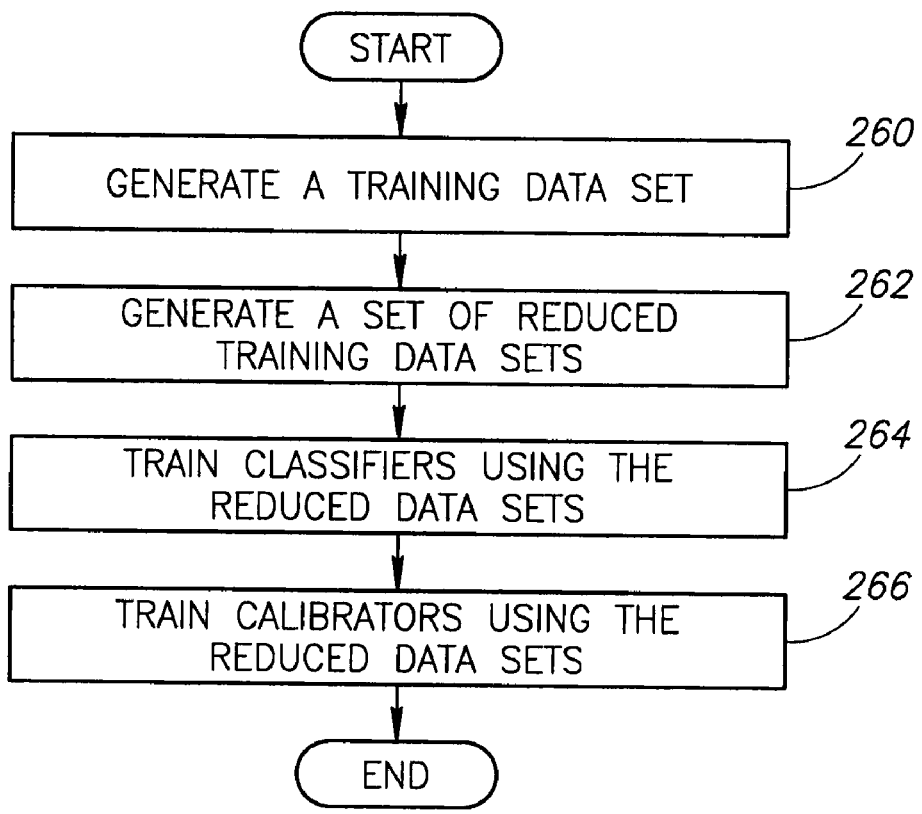
FIG. 9 is a flow chart showing a method of training using reduced training data sets.

A smarter strategy is class sampling (see FIGS. 3 and 9). Class sampling includes generating a reduced training data set for each single-class binary classifier by keeping all the flow records belonging to that class and uniformly sampling flows from other classes. However the number of flows in high volume classes can still exceed hardware-imposed limits. To overcome the problem of high volume classes, a weighted threshold sampling strategy is used with the objective of creating a smaller but more balanced reduced training data set. The weighted threshold sampling method includes keeping all flows belonging to a class $C_g$ if a number of flows $|C_g|$ in the class $C_g$ is below a flow count threshold $\theta$, but if the number of flows $|C_g|$ is greater than the flow count threshold $\theta$, performing simple random sampling on flow sets belonging to $C_g$ with a sampling rate equal to the flow count threshold $\theta$ divided by the number of flows $|C_g|$, thus yielding a number of flows equal to the flow count threshold $\theta$ on average. Although this procedure creates a more balanced reduced training set, it also introduces bias since the distribution of flows across application classes is different for the training data set than for live traffic, leading to violation of the IID assumption in machine learning algorithms. This problem can be addressed through calibration in the manner described above.

FIG. 3 is a block diagram showing a reduced data classifier training system 130. The reduced data classifier training system 130 has all the components of the classifier training system 120 and has in addition a training data reducer 128 and a set of k reduced training data set databases 126. In some embodiments, the reduced training data set databases 126 are hosted on separate physical servers, but in other embodiments, one or more of the reduced training data set databases are hosted on the same physical server.

The training data reducer 128 is communicatively coupled with the training database 116. The training data reducer 128 is configured to generate a reduced training data set for each of the k traffic classes.

The reduced training data sets are communicatively coupled with the training data reducers 128 and each of the k reduced training data sets is communicatively coupled with the binary classifier 104 that is associated with the same traffic class. The reduced training data sets are each configured to provide the associated reduced training set to the respective binary classifier 104 associated with the same class.

FIG. 9 is a flow chart showing a method of training using reduced training data sets.

In step 260, the reduced classifier training system 130 performs the step of generating a training data set. This step is essentially identical to step 200 discussed above.

In step 262, the reduced classifier training system 130 performs the step of generating a set of reduced training data sets. Each reduced training data set is a portion of the training data set from step 260. Each reduced training data set is stored in a separate reduced training data base 126. In some embodiments, the number of reduced training data sets generated is equal to the number of traffic classes k and each reduced training data set is associated with one of the traffic classes. In some embodiments, generating the reduced training data sets is performed by generating a matching portion and a non-matching portion of the training data set for each of the plurality of traffic classes. The matching portion of the training data set has training flow sets from the training data set that have class labels matching the traffic class. The non-matching portion has flow sets uniformly sampled from the training data set that do not have class labels matching the traffic class. In some embodiments, all flow sets of the matching portion of the training data set are incorporated into the reduced training data set if a count of matching flow sets is less than a flow count threshold. In some embodiments, a sampled portion of the flow sets of the matching portion of the training data set are incorporated into the reduced training data set if the count of matching flow sets is greater than or equal to the flow count threshold.

In step 264, the reduced classifier training system 130 performs the step of training the set of binary classifiers 104 using the reduced training data sets. Training each binary classifier 104 uses the reduced training data set associated with the same traffic class as the binary classifier 104. Other than using the reduced training data sets, this step is the same as step 202 described above.

In step 266, the reduced classifier training system 130 performs the step of training the set of calibrators 106. As discussed above, the non-random sampling of training data used to train the classifiers 104 may skew the results of the classification process. The calibrators 110 compensate from any skewing that may occur. The data used during the calibrators is randomly selected data provided by the calibrator data sampler 122 (see FIG. 3) and classified by the calibrator data classifier 124. The randomly selected data is fed in to each of the classifiers 104. The output of the classifiers is fed to the respective calibrators 106 and the respective calibrator trainers 110. The calibration training process is conducted in the manner described above. Thus, the classifier training process utilizes reduced training sets, while the calibrator training process is conducted in the normal fashion. The use of the calibrators 106 in conjunction with the classifiers 104 produces more accurate results than use of the classifiers alone.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method of training a traffic classifier comprising:

generating a training data set comprising a plurality of training flow sets, each training flow set comprising one of a plurality of training feature sets and an associated one of a plurality of class labels, each training feature set and associated class label based on measurements of one of a plurality of training packet flows, the associated class label identifying to which one of a plurality of traffic classes the one of the plurality of training packet flows belongs;

training a plurality of binary classifiers using the training data set, each binary classifier associated with one of the plurality of traffic classes, each binary classifier configured to generate an output score based on one of the training feature sets and based on measurements of a packet flow; and training a plurality of calibrators using the training data set, wherein each calibrator is associated with one of the plurality of binary classifiers, wherein the training the plurality of calibrators comprises training each of the plurality of calibrators to translate the output score of the associated binary classifier into a estimated class probability value, the estimated class probability value indicating a probability that the packet flow on which the output score is based belongs to the traffic class associated with the binary classifier associated with the calibrator, wherein the training each of the plurality of calibrators further comprises, for each calibrator:

generating a set of output scores using the binary classifier associated with the calibrator, each output score based on one of the plurality of feature sets in the training data set;

dividing the set of output scores into a set of intervals;

determining for each interval a total number of class labels associated with the interval and a number of matching class labels associated with the interval, wherein the class labels associated with the interval are class labels associated with a same flow set as used to generate any of the output scores in the interval, wherein the matching class labels identify the traffic class associated with the binary classifier associated with the calibrator;

calculating a set of empirical class probability values, one for each interval by dividing the number of matching class labels associated with the interval by the total number of class labels associated with the interval;

creating a reliability diagram by mapping the set of empirical class probability values against the set of intervals; and fitting the reliability diagram to a logistic curve.

2. The method of claim 1 wherein the training each of the plurality of calibrators further comprises, for each calibrator:

generating a set of output scores based on the plurality of training feature sets using the binary classifier associated with the calibrator;

creating a reliability diagram based on the set of output scores and based on a set of empirical class probability values, the set of empirical class probability values based on the plurality of class labels; and fitting the reliability diagram to a logistic curve.

3. The method of claim 1 wherein the generating the training data set further comprises using flow sampling and packet sampling to create the plurality of training feature sets.

4. The method of claim 1 wherein the training the plurality of binary classifiers further comprises training the plurality of binary classifiers with an adaboost algorithm.

5. The method of claim 1 wherein the training the plurality of binary classifiers further comprises training the plurality of binary classifiers with a maxent algorithm.

6. The method of claim 1 wherein the training the plurality of binary classifiers further comprises training a plurality of binary classifiers using decision stumps.

7. The method of claim 1 wherein the generating the training data set further comprises:

generating the plurality of feature sets based on measurements of flow layer information in the plurality of training packet flows; and generating the plurality of class labels based on measurements of application layer information in the plurality of training packet flows.

8. A method of training a traffic classifier comprising:

generating a training data set comprising a plurality of training flow sets, each training flow set comprising one of a plurality of training feature sets and an associated one of a plurality of class labels, each training feature set and associated class label based on measurements of one of a plurality of training packet flows, the associated class label identifying to which one of a plurality of traffic classes the one of the plurality of training packet flows belongs, wherein the generating the training data set comprises using flow sampling and packet sampling to create the plurality of training feature sets, wherein the using flow sampling and packet sampling to create the plurality of training feature sets further comprises:

detecting flow sampling candidate packets, wherein the flow sampling candidate packets are packets in the plurality of training packet flows with key values that have not been designated as flow reporting ineligible;

selecting flow sampling packets from the flow sampling candidate packets based on a specified flow sampling rate;

generating flow sampling feature sets based on the flow sampling packets;

designating key values of flow sampling candidate packets not selected to be flow sampling packets as flow reporting ineligible for a period of time;

designating key values of flow sampling packets selected for flow reporting as flow reporting ineligible while generating the respective flow sampling feature set;

selecting packet sampling packets at a packet sampling rate from the packets in the plurality of training packet flows not selected as flow sampling packets;

generating packet sampling feature sets based on the packet sampling packets; and generating the plurality of training feature sets by aggregating the flow sampling feature sets and the packet sampling feature sets;

training a plurality of binary classifiers using the training data set, each binary classifier associated with one of the plurality of traffic classes, each binary classifier configured to generate an output score based on one of the training feature sets and based on measurements of a packet flow; and training a plurality of calibrators using the training data set, wherein each calibrator is associated with one of the plurality of binary classifiers, wherein the training the plurality of calibrators comprises training each of the plurality of calibrators to translate the output score of the associated binary classifier into a estimated class probability value, the estimated class probability value indicating a probability that the packet flow on which the output score is based belongs to the traffic class associated with the binary classifier associated with the calibrator.

9. The method of claim 8 wherein the training the plurality of binary classifiers further comprises training the plurality of binary classifiers with an adaboost algorithm.

10. The method of claim 8 wherein the training the plurality of binary classifiers further comprises training the plurality of binary classifiers with a maxent algorithm.

11. The method of claim 8 wherein the training the plurality of binary classifiers further comprises training a plurality of binary classifiers using decision stumps.

12. The method of claim 8 wherein the generating the training data set further comprises:

generating the plurality of feature sets based on measurements of flow layer information in the plurality of training packet flows; and generating the plurality of class labels based on measurements of application layer information in the plurality of training packet flows.

\* \* \* \* \*